United States Patent
Sandford

(10) Patent No.: US 10,519,042 B2
(45) Date of Patent: Dec. 31, 2019

(54) COBALT OXIDE NANOPARTICLE PREPARATION

(71) Applicant: Cerion, LLC, Rochester, NY (US)

(72) Inventor: David Wallace Sandford, Rochester, NY (US)

(73) Assignee: Cerion, LLC, Rochester, NY (US)

( * ) Notice: Subject to any disclaimer, the term of this patent is extended or adjusted under 35 U.S.C. 154(b) by 0 days.

(21) Appl. No.: 15/542,976

(22) PCT Filed: Jan. 12, 2016

(86) PCT No.: PCT/US2016/012973
§ 371 (c)(1),
(2) Date: Jul. 12, 2017

(87) PCT Pub. No.: WO2016/115085
PCT Pub. Date: Jul. 21, 2016

(65) Prior Publication Data
US 2018/0002191 A1 Jan. 4, 2018

Related U.S. Application Data

(60) Provisional application No. 62/125,077, filed on Jan. 12, 2015.

(51) Int. Cl.
*C01G 51/04* (2006.01)
*B01J 23/75* (2006.01)
(Continued)

(52) U.S. Cl.
CPC .............. *C01G 51/04* (2013.01); *B01J 23/75* (2013.01); *B01J 35/0013* (2013.01); *B01J 37/04* (2013.01);
(Continued)

(58) Field of Classification Search
CPC ....... C01G 51/04; B01J 35/0013; B01J 23/75; B01J 37/04; C01P 2004/64; C01P 2002/72
See application file for complete search history.

(56) References Cited

U.S. PATENT DOCUMENTS

| 4,244,938 A | 1/1981 | Alkaitis |
| 8,679,344 B2 | 3/2014 | Allston et al. |
| (Continued) | | |

FOREIGN PATENT DOCUMENTS

WO    2008033227 A2    3/2008

OTHER PUBLICATIONS

Allaedini, Ghazaleh, and Abubakar Muhammad. "Study of influential factors in synthesis and characterization of cobalt oxide nanoparticles." Journal of Nanostructure in Chemistry 3.1 (2013): 77.*

(Continued)

*Primary Examiner* — Richard M Rump
(74) *Attorney, Agent, or Firm* — RatnerPrestia

(57) ABSTRACT

A method of making stable aqueous dispersions and concentrates of cobalt oxide nanoparticles is described, wherein a reaction mixture comprising cobalt(II) ion, a carboxylic acid, a base, an oxidant and water is formed, and in which cobalt oxide nanoparticles are formed. Cobalt oxide nanoparticles ranging in average crystallite size from about 4 nm to 15 nm are described. The cobalt oxide nanoparticles may be isolated and redispersed to form stable, homogeneous, aqueous dispersions of cobalt oxide nanoparticles containing from about 1 to about 20 weight percent cobalt oxide.

15 Claims, 2 Drawing Sheets

(51) Int. Cl.
  *B01J 35/00* (2006.01)
  *B01J 37/04* (2006.01)
(52) U.S. Cl.
  CPC ...... *C01P 2002/72* (2013.01); *C01P 2004/64* (2013.01)

(56) References Cited

U.S. PATENT DOCUMENTS

| | | |
|---|---|---|
| 2010/0135897 A1 | 6/2010 | He |
| 2012/0168692 A1* | 7/2012 | Son, II ...................... C09C 1/62 252/514 |

OTHER PUBLICATIONS

Li, Yunling, et al. "Low temperature aqueous synthesis of highly dispersed Co3O4 nanocubes and their electrocatalytic activity studies." Chemical engineering journal 166.1 (2011): 428-434.*

Shao, Huiping, et al. "Cobalt nanoparticles synthesis from Co (CH3COO) 2 by thermal decomposition." Journal of Magnetism and Magnetic Materials 304.1 (2006): e28-e30.*

Zhao, Z. W., et al. "In-situ fabrication of nanostructured cobalt oxide powders by spray pyrolysis technique." Journal of nanoscience and nanotechnology 4.7 (2004): 861-866.*

Hosseini, S. Masoud, et al. "The effect of nanoparticle concentration on the rheological properties of paraffin-based Co 3 O 4 ferrofluids." Journal of Nanoparticle Research 14.7 (2012): 858.*

International Search Report and Written Opinion for International Application No. PCT/US2016/012973, dated Apr. 1, 2016—10 Pages.

Yuanchun, et al., "Preparation of cobalt oxide nanoparticles and cobalt powders by solvothermal process and their characterization", Materials Chemistry and Physics, Elsevier SA, Switzerland, Taiwan, Republic of China, vol. 10, No. 2-3, Aug. 15, 2008, pp. 457-462.

Dong et al., "A facile route to controlled synthesis of Co3O4 nanoparticles and their environmental catalytic properties", Nanotechnology, IOP, Bristol, GB, vol. 18, No. 43, Oct. 31, 2007, pp. 435602.

Yang, et al., Mechanochemical Synthesis of Cobalt Oxide Nanoparticles, Materials Letters, vol. 58, No. 3-4, Jan. 1, 2004.

European Communication for European Application No. 16 701 707.8, dated Sep. 5, 2018, 5 pages.

* cited by examiner

COBALT OXIDE NANOPARTICLE PREPARATION

CROSS-REFERENCE TO RELATED APPLICATIONS

This application is a U.S. National Phase application of PCT International Application No. PCT/US16/012973, filed Jan. 12, 2016, which claims priority to Provisional Application No. 62/125,077, COBALT OXIDE NANOPARTICLE PREPARATION, filed Jan. 12, 2015, the disclosures of which are incorporated herein by reference in their entirety.

FIELD OF THE INVENTION

The present invention relates in general to methods of making cobalt oxide nanoparticles and aqueous dispersions thereof. In particular, the invention relates to methods of varying the size of cobalt oxide nanoparticles, to methods of preparing and purifying stable aqueous dispersions of cobalt oxide nanoparticles, and to the use thereof, for example, in chemical catalysis and electronic materials applications.

BACKGROUND OF THE INVENTION

Cobalt oxide is used in a number of commercial chemical catalytic processes, such as, for example, the Fisher-Tropsch family of hydrogenation reactions of CO and $CO_2$, the total oxidation of volatile organic compounds, and the selective oxidation of alkanes to alkenes at relatively low (ambient) temperatures. It is widely believed that further reduction of the particle size of cobalt oxide into the nanoparticle range will increase the activity of cobalt oxide catalysts, thereby lowering the reaction temperatures required, and extending the useful life of working catalyst samples.

Thus, there remains a need for simple methods for the preparation of cobalt oxide nanoparticles with a narrow size distribution, for methods to more precisely control the average particle size, while using low cost and environmentally friendly materials, that produce nanoparticles that can be dispersed in water at high suspension densities and remain stable.

SUMMARY OF THE INVENTION

In accordance with a first aspect of the invention, a method of making nanoparticles is provided, comprising: forming a reaction mixture comprising cobalt(II) ion, a carboxylic acid, a base, an oxidant and water; optionally, heating or cooling the reaction mixture; optionally adding a second portion of an oxidant; and forming cobalt oxide nanoparticles in the reaction mixture.

In accordance with a second aspect of the invention, a method of making nanoparticles is provided, comprising: forming a reaction mixture comprising cobalt(II) ion, a carboxylic acid, and water; adjusting the pH of the reaction mixture to alkaline conditions by addition of a base; adding a peroxide to the reaction mixture; optionally, heating or cooling the reaction mixture; optionally adding a second portion of a peroxide to the reaction mixture, and forming cobalt oxide nanoparticles in the reaction mixture.

In accordance with a third aspect of the invention, a method of making an aqueous dispersion of nanoparticles is provided, comprising: forming a reaction mixture comprising cobalt(II) ion, a carboxylic acid, a base, an oxidant and water; optionally, heating or cooling the reaction mixture; optionally adding a second portion of an oxidant; forming cobalt oxide nanoparticles in the reaction mixture; isolating the cobalt oxide nanoparticles from the reaction mixture; and dispersing the isolated cobalt oxide nanoparticles in water to form a stable aqueous dispersion of cobalt oxide nanoparticles.

In accordance with a fourth aspect of the invention, a process of making an aqueous dispersion of nanoparticles is provided, comprising: forming a reaction mixture comprising cobalt(II) ion, a carboxylic acid, and water; adjusting the pH of the reaction mixture to alkaline conditions by addition of a base; adding a peroxide to the reaction mixture; optionally, heating or cooling the reaction mixture; optionally adding a second portion of a peroxide to the reaction mixture, forming cobalt oxide nanoparticles in the reaction mixture; isolating the cobalt oxide nanoparticles from the reaction mixture; and dispersing the isolated cobalt oxide nanoparticles in water to form a stable aqueous dispersion of cobalt oxide nanoparticles.

DETAILED DESCRIPTION OF THE INVENTION

Figure 1:
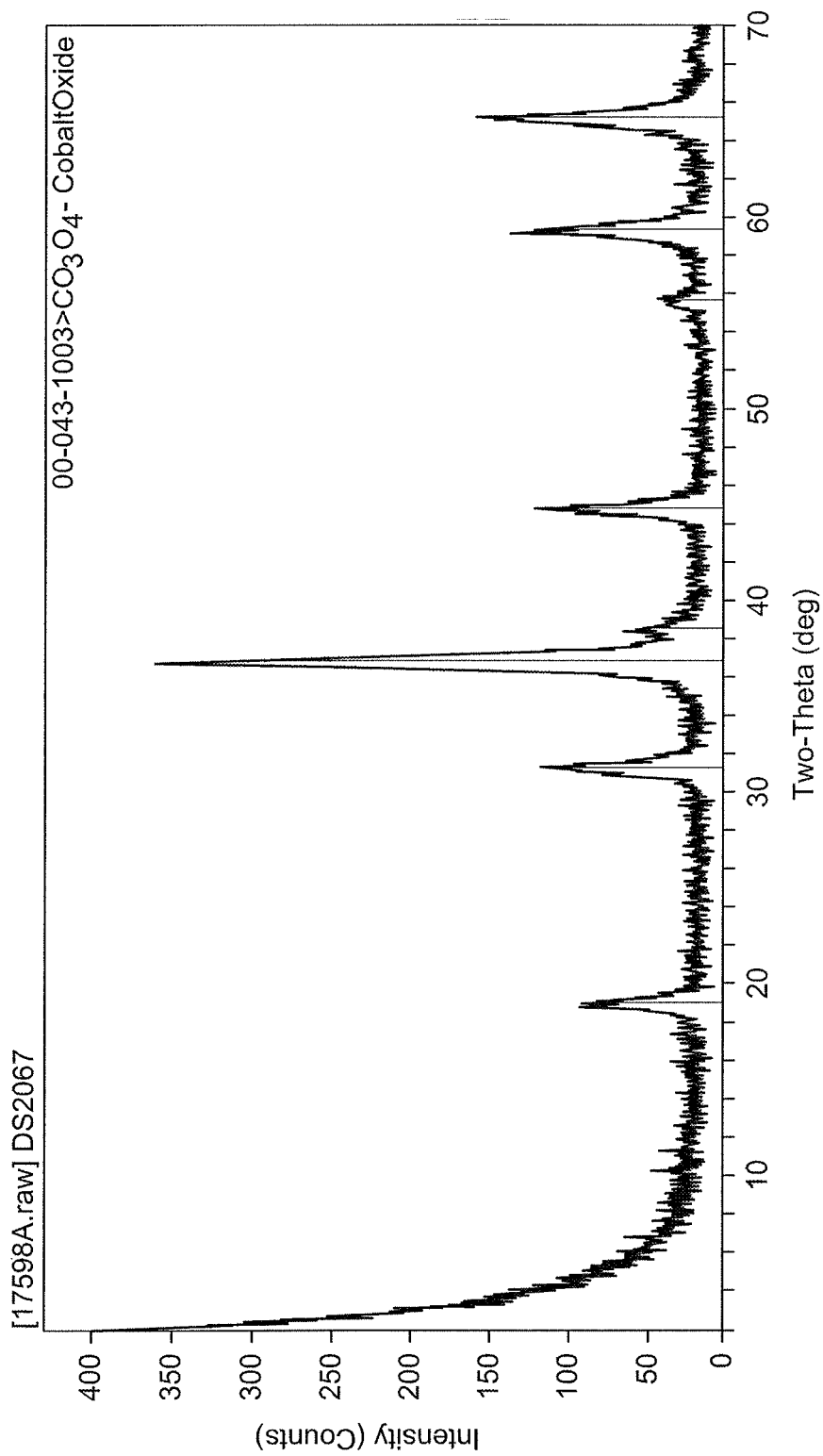
FIG. 1 is a powder X-ray Diffraction (XRD) spectrum of the nanoparticles prepared in Example 1, along with a line spectrum of cobalt oxide (PDF 00-043-1003, $Co_3O_4$).

It is to be understood that elements not specifically shown or described may take various forms well known to those skilled in the art. The invention is defined by the claims.

In this application, the term nanoparticle includes particles having a mean diameter of less than 100 nanometers (nm). For the purposes of this disclosure, unless otherwise stated, the diameter of a nanoparticle refers to its average crystallographic particle diameter, which can be estimated by a peak width analysis of powder X-ray diffraction (XRD) spectra using the Scherrer equation. Alternatively, the geometric particle diameter can be estimated by analysis of transmission electron micrographs (TEM). Alternatively, the hydrodynamic diameter, which includes molecular adsorbates and the accompanying solvation shell of the particle, can be determined by dynamic light scattering techniques. In addition, for substantially monodisperse nanoparticle size distributions having geometric size in the 1-10 nm range, XRD may also reveal a profile of increased scattering as the origin ($2\theta$=zero) is approached from a very low angle that is a direct measure of size of the scattering centers.

In this disclosure, the term "metal" in referring to elements of the Periodic Table includes all elements other than those of the following atomic numbers: 1-2, 5-10, 14-18, 33-36, 52-54, 85 and 86.

The term "transition metal" is understood to encompass the 30 chemical elements of atomic number 21 to 30, 39 to 48, 57, and 72 to 80, which are included in Periods 4, 5, 6, respectively, of the Periodic Table.

The term "rare earth metal" is understood to encompass the 14 lanthanide chemical elements of atomic number 58 to 71, and the 14 actinide chemical elements of atomic number 90 to 103.

The term "alkali metal" is understood to encompass the 6 chemical elements forming Group 1 of the Periodic Table, those of atomic number 3, 11, 19, 37, 55, and 87.

The term "alkaline earth metal" is understood to encompass the 6 chemical elements forming Group 2 of the Periodic Table, those of atomic number 4, 12, 20, 38, 56, and 88.

In this application, the term "crystalline" is understood to describe a material that displays at least one X-ray or electron diffraction peak (excluding very low angle XRD peaks not assignable to a crystal structure), wherein the peak intensity is discernibly greater than the background scattering (baseline noise). The terms "semi-crystalline" or "partially crystalline" are understood to describe a material that displays only broad X-ray or electron diffraction peaks of low peak intensity due to a lack of long-range order. The term "amorphous" is understood to describe a material that does not display any X-ray or electron diffraction peaks (excluding very low angle XRD peaks not assignable to a crystal structure).

In general, it is understood by one skilled in the chemical arts that the term "cobalt oxide" may encompass chemical compounds of the following three classes: 1) cobalt(II) oxide (CAS No. 1307-96-6), also known as cobaltous oxide or cobalt monoxide, and given by the chemical formula CoO; 2) mixed valent cobalt(II,III) oxide (CAS No. 1308-06-1), also known as cobalt(II) dicobalt(III) oxide, cobaltosic oxide or tricobalt tetraoxide, given by the chemical formulae $Co_3O_4$, $Co^{II}Co^{III}_2O_4$ or $CoO \cdot Co_2O_3$; and 3) cobalt(III) oxide (CAS No. 1308-04-9), also known as cobaltic oxide, given by the chemical formula $Co_2O_3$.

In this application, however, the term "cobalt oxide" is understood to refer specifically to the mixed valent cobalt (II,III) oxide given by, for example, the chemical formula $Co_3O_4$, unless stated otherwise.

In this application, the term "stable dispersion" or "stable concentrate" is used to describe a dispersion or concentrate for which no sediment is irreversibly formed after a predetermined period of time, but may require minor agitation to reform a homogeneous dispersion or homogeneous concentrate.

In accordance with an embodiment of the invention, a method of making nanoparticles is provided, comprising: forming a reaction mixture comprising cobalt(II) ion, a carboxylic acid, a base, an oxidant and water; optionally, heating or cooling the reaction mixture; optionally adding a second portion of an oxidant; and forming cobalt oxide nanoparticles in the reaction mixture.

In various embodiments, the cobalt(II) ion is provided by cobalt(II) salts, such as, for example, cobalt(II) acetate, cobalt(II) acetylacetonate, cobalt(II) carbonate, cobalt(II) hydroxide, cobalt(II) nitrate, cobalt(II) oxalate, and hydrates thereof. In a particular embodiment, the cobalt(II) ion is provided by cobalt(II) nitrate hexahydrate.

In various embodiments, the carboxylic acid comprises water soluble carboxylic acids, such as, for example, $C_1$-$C_6$ alkyl carboxylic acids, including, for example, formic acid, acetic acid, propionic acid, butyric acid, valeric acid and caproic acid, and derivatives thereof.

In other embodiments, the carboxylic acid comprises water soluble ether carboxylic acids. In particular embodiments, the carboxylic acid comprises monoether carboxylic acids, such as, for example, methoxyacetic acid, ethoxyacetic acid, and 3-methoxypropionic acid. In particular embodiments, the carboxylic acid comprises polyether carboxylic acids, such as, for example, 2-(2-methoxyethoxy)acetic acid and 2-[2-(2-methoxyethoxy)ethoxy]acetic acid.

In a particular embodiment, the base comprises ammonium hydroxide. In other embodiments, the base comprises sodium or potassium hydroxide.

In various embodiments, the oxidant comprises a salt of perchlorate, chlorate, hypochlorate or persulfate; ozone or a peroxide. In particular embodiments, the peroxide is hydrogen peroxide ($H_2O_2$) or tert-butyl hydroperoxide. In various embodiments, the molar ratio of oxidant to cobalt(II) ion varies widely, ranging, for example, from about 0.5 to about 4.0.

In particular embodiments, the reaction mixture is heated or cooled to a temperature in the range of about 0° C. to about 100° C.

In a particular embodiment, the crystallinity of the nanoparticles formed is enhanced by heating of the reaction mixture.

In accordance with another embodiment, a method of making nanoparticles is provided, comprising: forming a reaction mixture comprising cobalt(II) ion, a carboxylic acid, and water; adjusting the pH of the reaction mixture to alkaline conditions by addition of a base; adding a peroxide to the reaction mixture; optionally, heating or cooling the reaction mixture; optionally adding a second portion of a peroxide to the reaction mixture, and forming cobalt oxide nanoparticles in the reaction mixture.

In various embodiments, the pH of the reaction mixture is adjusted to a value greater than 7.0, greater than 8.0, greater than 9.0, greater than 10.0, or greater than 11.0. In particular embodiments, the pH of the reaction mixture is adjusted to a value in the range from about 7.0 to about 10.0, from about 8.0 to about 10.0, or from about 8.0 to about 9.5.

Once more, in a particular embodiment, the peroxide is hydrogen peroxide ($H_2O_2$).

In accordance with a second aspect of embodiments of the invention, a method of making an aqueous dispersion of nanoparticles is provided, comprising: forming a reaction mixture comprising cobalt(II) ion, a carboxylic acid, a base, an oxidant and water; optionally, heating or cooling the reaction mixture; optionally adding a second portion of an oxidant; forming cobalt oxide nanoparticles in the reaction mixture; isolating the cobalt oxide nanoparticles from the reaction mixture; and dispersing the isolated cobalt oxide nanoparticles in water to form a stable aqueous dispersion of cobalt oxide nanoparticles.

In another embodiment of the invention, a process of making an aqueous dispersion of nanoparticles is provided, comprising: forming a reaction mixture comprising cobalt (II) ion, a carboxylic acid, and water; adjusting the pH of the reaction mixture to alkaline conditions by addition of a base; adding a peroxide to the reaction mixture; optionally, heating or cooling the reaction mixture; optionally adding a second portion of a peroxide to the reaction mixture, forming cobalt oxide nanoparticles in the reaction mixture; isolating the cobalt oxide nanoparticles from the reaction mixture; and dispersing the isolated cobalt oxide nanoparticles in water to form a stable aqueous dispersion of cobalt oxide nanoparticles.

In various embodiments, isolating the cobalt oxide nanoparticles from the reaction mixture is provided by any of the following processes: a settling, sedimentation, precipitation, or centrifugation step to isolate the cobalt oxide nanoparticles, followed by a filtration, evaporation or rotary-evaporation process, or a decanting of supernatant step to remove aqueous solvent; or by a combination of these processes, or by any other process known in the chemical arts.

In various embodiments, the addition of a second portion of an oxidant, such as, for example, a peroxide or hydrogen peroxide, may be accomplished by a plurality of additions or aliquots such that the addition of the second portion is spread out over a predetermined period of time, such as, for example, a period of minutes to hours.

In various embodiments, dispersing of the isolated cobalt oxide nanoparticles in water is aided by the application of mechanical energy, such as, for example, stirring, shearing, shaking or ultrasonic agitation.

In particular embodiments, the final amount of water into which the cobalt oxide nanoparticle sediment is dispersed is sufficiently small to enable the formation of a cobalt oxide nanoparticle concentrate.

In various embodiments, the amount of cobalt oxide nanoparticles in the product dispersion or concentrate is greater than about 0.01 weight percent (wt. %) cobalt oxide, greater than about 0.05 wt. % cobalt oxide, greater than about 0.5 wt. % cobalt oxide, greater than about 2 wt. % cobalt oxide, greater than about 5 wt. % cobalt oxide, greater than about 10 wt. % cobalt oxide, greater than about 15 wt. % cobalt oxide, greater than about 20 wt. % cobalt oxide.

In a particular embodiment, the dispersion of cobalt oxide nanoparticles is formed directly in the reaction mixture, and is concentrated by diafiltration such that a stable dispersion of the cobalt oxide nanoparticles is maintained throughout the process (without isolation of the cobalt oxide nanoparticles).

Without being bound by any theory, the settling, sedimentation, precipitation, centrifugation or other process by which the cobalt oxide nanoparticles are isolated from the water solvent may proceed by a particle aggregation or agglomeration process, wherein the attractive inter-particle forces are sufficiently weak to subsequently enable efficient dispersal of the cobalt oxide nanoparticle sediment to form a stable aqueous nanoparticle dispersion or concentrate. The presence of the carboxylic acid in the reaction mixture or the absorption of the carboxylic acid onto the cobalt oxide nanoparticle surface may impart sufficiently weak inter-particle forces that enable efficient dispersal of the cobalt oxide nanoparticle sediment to form a stable aqueous nanoparticle dispersion or concentrate.

In particular embodiments, aqueous dispersions of cobalt oxide nanoparticles have been observed to be stable for more than 2 months of storage time.

In various other embodiments, the reaction mixture further comprises a metal ion other than a cobalt ion, such as, for example, a transition metal ion other than cobalt, a rare earth metal ion, alkaline earth metal ion or an alkali metal ion.

In particular embodiments, no alkali metal, alkaline earth metal or sulfur is added to the reaction mixture (i.e. none beyond those inherently present as impurities in the starting materials).

In various embodiments, the reaction mixture is formed in a batch reactor or a continuous reactor, such as, for example, a continuous-stirred-tank reactor or a plug-flow reactor.

The particular embodiments, various mixing devices known in the art are employed to stir, mix, shear or agitate the contents of the reaction mixture. In various embodiments, mixers comprising stir bars, marine blade propellers, pitch blade turbines or flat blade turbines are used. In particular embodiments, a colloid mill or a Silverson® High Shear Mixer is employed. In a particular embodiment, a high shear mixer that forces the reaction mixture to pass through a screen, wherein holes vary in size from fractions of a millimeter to several millimeters, is employed. In particular embodiments, one or more of the reactants is introduced below the surface of the aqueous reaction mixture. In a particular embodiment, a reactant is introduced below the surface of the aqueous reaction mixture in close proximity to a mixing device.

In various embodiments, the nanoparticles formed are amorphous, semi-crystalline or crystalline.

In a particular embodiment, an aqueous dispersion of individual (i.e. non-aggregated and non-agglomerated) crystalline cobalt oxide nanoparticles, alternatively described as single particle crystallites or as individual crystallites, is provided.

In a particular embodiment, the nanoparticles formed are characterized by a cubic spinel crystal structure.

In various embodiments, the cobalt oxide nanoparticles formed have an average crystallite size ranging from about 4 nanometers to about 15 nanometers.

In a particular embodiment, nanoparticles comprising cobalt oxide and a carboxylic acid, is provided.

In particular embodiments, nanoparticles comprising cobalt oxide and acetic acid or acetate ion, are provided. In various embodiments, nanoparticles comprising cobalt oxide in an amount ranging from about 86% to about 92% by weight, and acetic acid or acetate ion in range of about 8% to about 14% by weight, are provided.

In a particular embodiment, an aqueous dispersion of nanoparticles comprising cobalt oxide and a carboxylic acid, is provided.

In a particular embodiments, an aqueous dispersion of nanoparticles comprising cobalt oxide and acetic acid or acetate ion, is provided. In a particular embodiment, an aqueous dispersion of nanoparticles comprising nanoparticles comprised of cobalt oxide in an amount ranging about 86% to about 92% by weight, and acetic acid or acetate ion in range of about 8% to about 14% by weight, is provided.

In particular embodiments, the size distribution of the cobalt oxide nanoparticles is substantially monomodal. In various embodiments, the cobalt oxide nanoparticle size distribution is characterized by a polydispersity index ranging from about 0.2 to about 0.3.

In one embodiment of the invention, a process of solvent shifting the aqueous cobalt oxide nanoparticle dispersion to a less polar solvent composition by methods disclosed in commonly assigned U.S. Pat. No. 8,679,344, the disclosure of which is hereby incorporated by reference, is employed. In a specific embodiment, the cobalt oxide nanoparticle dispersion is passed through a diafiltration column along with the addition of an organic diluent to the dispersion stream or reservoir. In a various embodiments, the organic diluent contains a surfactant, such as, for example, one or more alcohols, ethers, glycol ethers or a carboxylic acid.

In a particular end use applications, embodiments of the inventive aqueous cobalt oxide nanoparticle dispersions, or the cobalt oxide nanoparticles derived therefrom, are employed as a catalyst in a chemical reaction, such as, for example, the Fisher-Tropsch family of hydrogenation reactions of CO and $CO_2$, the total oxidation of volatile organic compounds, the selective oxidation of alkanes to alkenes at relatively low (ambient) temperatures, and the photo-catalytic production of molecular hydrogen from water.

In other end use applications, electronic materials used in integrated circuit fabrication may be doped with cobalt or cobalt oxide using the aqueous product dispersion embodiments of cobalt oxide nanoparticles, or the cobalt oxide nanoparticles derived therefrom.

The invention is further illustrated by the following examples, which are not intended to limit the invention in any manner.

EXPERIMENTAL SECTION

Nanoparticle Scattering and Size Assessments

Quantitative assessments of the particle size of the nanoparticle dispersions can be made by a number of techniques.

Particle size estimation by peak-width analysis of X-ray diffraction (XRD) spectra was done using the Scherrer method. Sample preparation for the XRD measurements was done as follows: precipitate collected from a filtration process was allowed to dry under ambient atmosphere conditions for several hours and then lightly ground before placing in a sample holder. The sample was then analyzed by XRD using a nitrogen gas dry cell attachment. The XRD spectra were recorded on a Rigaku D2000 diffractometer equipped with copper rotating anode, diffraction beam graphite monochrometer tuned to copper K-alpha radiation, and a scintillation detector.

Alternatively, dynamic light scattering (DLS) measurements were obtained using a Brookhaven 90Plus Particle Size Analyzer (Brookhaven Instruments Corp., Holtzville, N.Y., U.S.A.) equipped with a quartz cuvette. DLS sizing was shown to be unaffected by a pre-filter step through a 0.2 micron syringe filter intended to remove possible bacterial contaminants. Reported DLS particle sizes are the lognormal number weighted parameter, and DLS particle size distributions are the polydispersity index parameter. Hydrodynamic particle sizes are typically larger than sizes yielded by other techniques because the DLS technique includes contributions from adsorbed ions or molecules that constitute the solvation sphere of the particle.

Alternatively, the size and size distribution of the nanoparticles could be determined by direct analysis of transmission electron microscopy (TEM) images of the particles.

Example 1

12.8 nm Cobalt Oxide ($Co_3O_4$) Nanoparticles

To a 1 L beaker, 41.9 g of cobalt (II) nitrate hexahydrate (CAS No. 10026-22-9, obtained from Alfa Aesar (Part No. 11341, 97.7% Min) was dissolved in 375 g deionized water, and 2.9 g of acetic acid was added while mixing with a magnetic stir bar in an air environment. The pH of mixture was 2.1 and the solution was a clear red color. The reaction mixture was held at an ambient temperature of 22° C. Next a solution of concentrated ammonium hydroxide was added until the pH reached 9.1. The solution turned blue and opaque. Subsequently, 10 g of a 50% hydrogen peroxide solution were added slowly to prevent significant foam generation during which time the solution turned a dark green color and the pH dropped to 8.8.

The reaction mixture was heated to 80° C. over 20 minutes and held at 80° C. for 200 minutes. For the first 120 minutes of the hold at 80° C., 2 g of 12.5% hydrogen peroxide was added at 6 minute intervals (a total of 20 additions, each of 2 g of 12.5% hydrogen peroxide). After 200 minutes at 80° C. the reaction vessel was cooled to room temperature with stirring under ambient conditions. The reaction product was black.

Once cooled, the stirring was turned off and the product allowed to settle to the bottom of the reaction vessel over a period of several hours. The light pink supernatant was removed and the black product captured on a 0.45 m filter membrane. The black product was air-dried overnight to remove any remaining water.

Analysis of the XRD spectrum of the black product shown in FIG. 1, indicated it was $Co_3O_4$ with an average crystallite size of 12.8 nm by the Scherrer method. Images from Transmission Electron Microscopy were consistent with this crystallite size. Addition of high purity water to the isolated product nanoparticles enabled preparation of stable, clear, aqueous product dispersions.

Example 2

4.5 nm Cobalt Oxide ($Co_3O_4$) Nanoparticles

Figure 2:
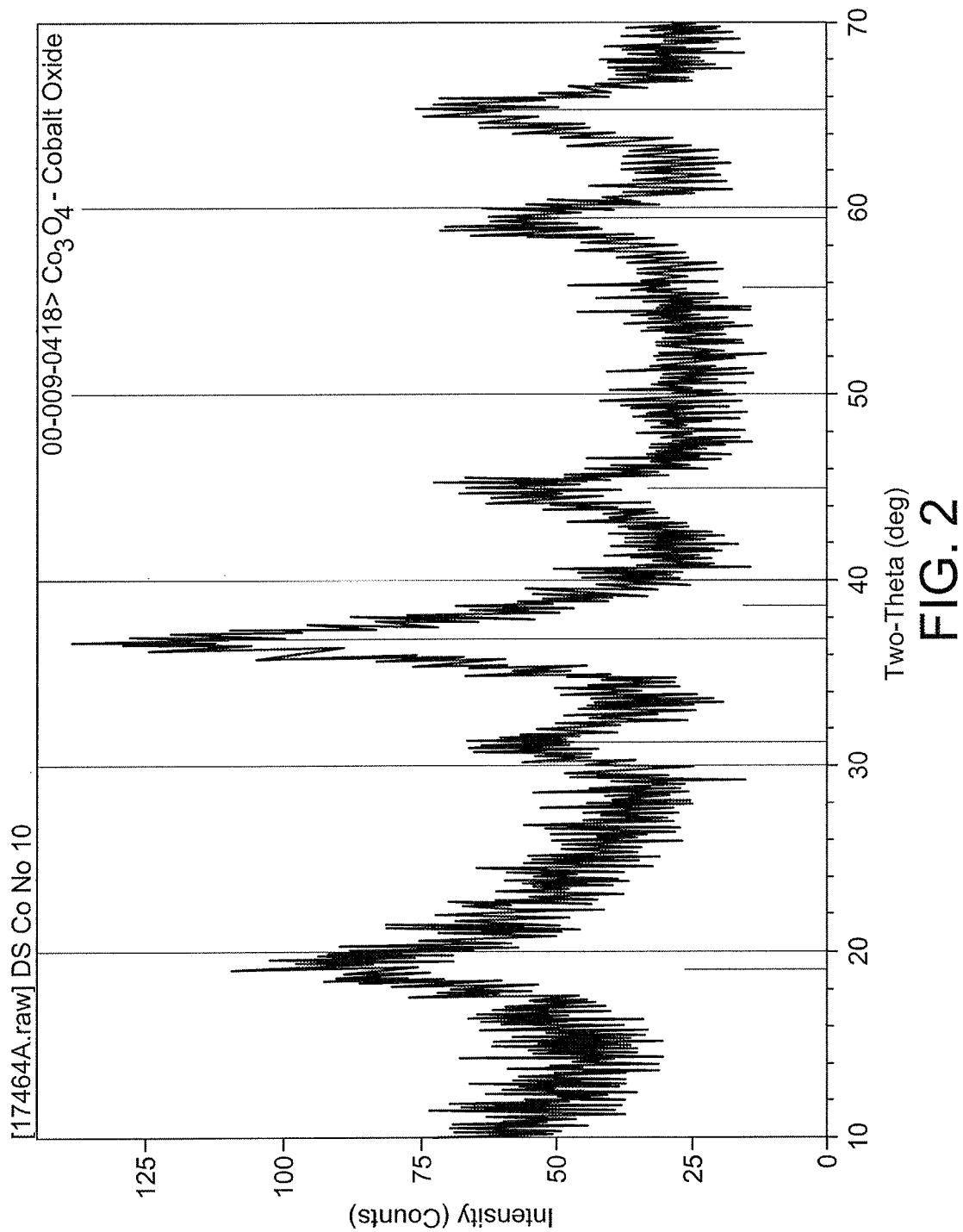
FIG. 2 is a powder X-ray Diffraction (XRD) spectrum of the nanoparticles prepared in Example 2, along with a line spectrum of cobalt oxide (PDF 00-009-0418, $Co_3O_4$).

The procedures of Example 1 were repeated, except that 1) the amount of acetic acid was increased from 2.9 g to 14.5 g, and 2) the pH of the reaction mixture was increase to a value of about 8.2, rather than 9.1, by the addition of ammonium hydroxide An XRD spectrum of the isolated product nanoparticles is shown in FIG. 2, wherein an excellent match with a line spectrum of $Co_3O_4$ is shown. An average crystallite size of 4.5 nanometers was determined using the Scherrer method. Determination of the hydrodynamic diameter by DLS on a dilute suspension of the final product dispersion showed the hydrodynamic diameter of the nanoparticles to be in good agreement with the average crystallite size from XRD, as well as the average particle diameter determined from analysis of TEM micrographs.

Therefore an increase in the amount of acetic acid, with no change in the amount of ammonium hydroxide, resulted in a reduction in the pH of the reaction mixture, and a decrease in the average crystallite size from about 13 nanometers to about 4-5 nanometers, a surprising and advantageous result.

Example 3

14-15 nm Cobalt Oxide ($Co_3O_4$) Nanoparticles

The procedures of Example 1 were repeated, except that the pH of the reaction mixture was increase to a value of about 9.5, rather than 9.1, by the addition of a greater amount ammonium hydroxide.

Analysis of an XRD spectrum (Scherrer method) of the isolated product nanoparticles indicated that nanoparticles of $Co_3O_4$ with an average crystallite size of about 14-15 nanometers were produced.

Example 4

Cobalt Oxide ($Co_3O_4$) Nanoparticle Yield

The procedures of Example 1 were repeated, except that the additions of the second portion of $H_2O_2$ (a total of 20 additions, each of 2 g of 12.5% hydrogen peroxide) during the first 120 minutes of the hold at 80° C., were eliminated. Similar results were obtained, except that the yield of cobalt oxide nanoparticles was reduced from about 90% to about 80%.

Example 5

Cobalt Oxide ($Co_3O_4$) Nanoparticle Concentrates

The procedures of Example 1 and Example 2 were repeated, except that the amounts of high purity water added to the isolated product nanoparticles were adjusted such that aqueous product dispersions comprising about 20% by weight of cobalt oxide nanoparticles were produced. The final product dispersions (concentrates) were stable and quite viscous, whereby application of a small amount of shear force was later required to fully homogenize and induce flow of the suspensions.

Example 6

Dilute Cobalt Oxide ($Co_3O_4$) Nanoparticle Suspensions

The procedures of Example 1 and Example 2 were repeated, except that the amounts of high purity water added to the isolated product nanoparticles were adjusted such that aqueous product dispersions comprising substantially less than 1% by weight of cobalt oxide nanoparticles were produced. These dilute product dispersions were observed to be stable for at least two months.

Example 7

Cobalt Oxide ($Co_3O_4$) Nanoparticles with Methoxyacetic Acid

The procedures of Example 2 were repeated, except that an equimolar amount of methoxyacetic acid was used in place of the acetic acid. Similar results were obtained.

While the invention has been described by reference to various specific embodiments, it should be understood that numerous changes may be made within the spirit and scope of the inventive concepts described. Accordingly, it is intended that the invention not be limited to the described embodiments, but will have full scope defined by claims language.

What is claimed:

1. A method of making nanoparticles, comprising:
   a. forming a reaction mixture comprising cobalt(II) ion, a carboxylic acid, a base, an oxidant, and water; and
   b. directly forming a dispersion of cobalt oxide nanoparticles in the reaction mixture.

2. The method of claim 1, further comprising heating or cooling said reaction mixture to a temperature in the range of about 0° C. to about 100°.

3. The method of claim 1, wherein said carboxylic acid is a water soluble carboxylic acid comprising a $C_1$-$C_6$ alkyl carboxylic acid.

4. The method of claim 3, wherein said water soluble carboxylic acid is acetic acid.

5. The method of claim 1, wherein said carboxylic acid is a monoether carboxylic acid or a polyether carboxylic acid.

6. The method of claim 5, wherein said monoether carboxylic acid is methoxyacetic acid, ethoxyacetic acid or 3-methoxypropionic acid.

7. The method of claim 1, wherein said oxidant is hydrogen peroxide.

8. The method of claim 1, further comprising adding a second portion of an oxidant.

9. The method of claim 8, wherein adding said second portion of an oxidant is provided by a plurality of additions of said oxidant.

10. The method of claim 1, wherein said reaction mixture is formed by the sequential steps of:
    1) adding cobalt(II) ion, a carboxylic acid, and water;
    2) adjusting the pH of the reaction mixture to alkaline conditions by addition of a base;
    3) adding an oxidant.

11. The method of claim 1, further comprising the steps of isolating and dispersing said cobalt oxide nanoparticles in water to form a stable aqueous dispersion of cobalt oxide nanoparticles, wherein the aqueous dispersion of cobalt oxide nanoparticles is stable for at least 2 months.

12. The method of claim 1, wherein said cobalt oxide nanoparticles are characterized by an average crystallite size ranging from about 4 nanometers to about 15 nanometers.

13. An aqueous nanoparticle dispersion comprising cobalt oxide nanoparticles and a carboxylic acid, wherein said cobalt oxide nanoparticles are characterized by an average crystallite size ranging from about 4 nanometers to about 15 nanometers.

14. A nanoparticle comprising cobalt oxide and a carboxylic acid, wherein said cobalt oxide nanoparticles are characterized by an average crystallite size ranging from about 4 nanometers to about 15 nanometers, wherein said carboxylic acid is a water soluble carboxylic acid comprising a $C_1$-$C_6$ alkyl carboxylic acid.

15. The nanoparticle of claim 14, wherein said water soluble carboxylic acid is acetic acid.

\* \* \* \* \*